May 25, 1965  A. E. ANDERSON ETAL  3,184,913
CONTROL SYSTEM FOR INFINITELY VARIABLE
POWER TRANSMISSION MECHANISM
Filed Nov. 18, 1963  9 Sheets-Sheet 1

ARNOLD E. ANDERSON
CHARLES C. BOOKOUT
ROBERT E. KAPTUR
INVENTORS

BY
ATTORNEYS

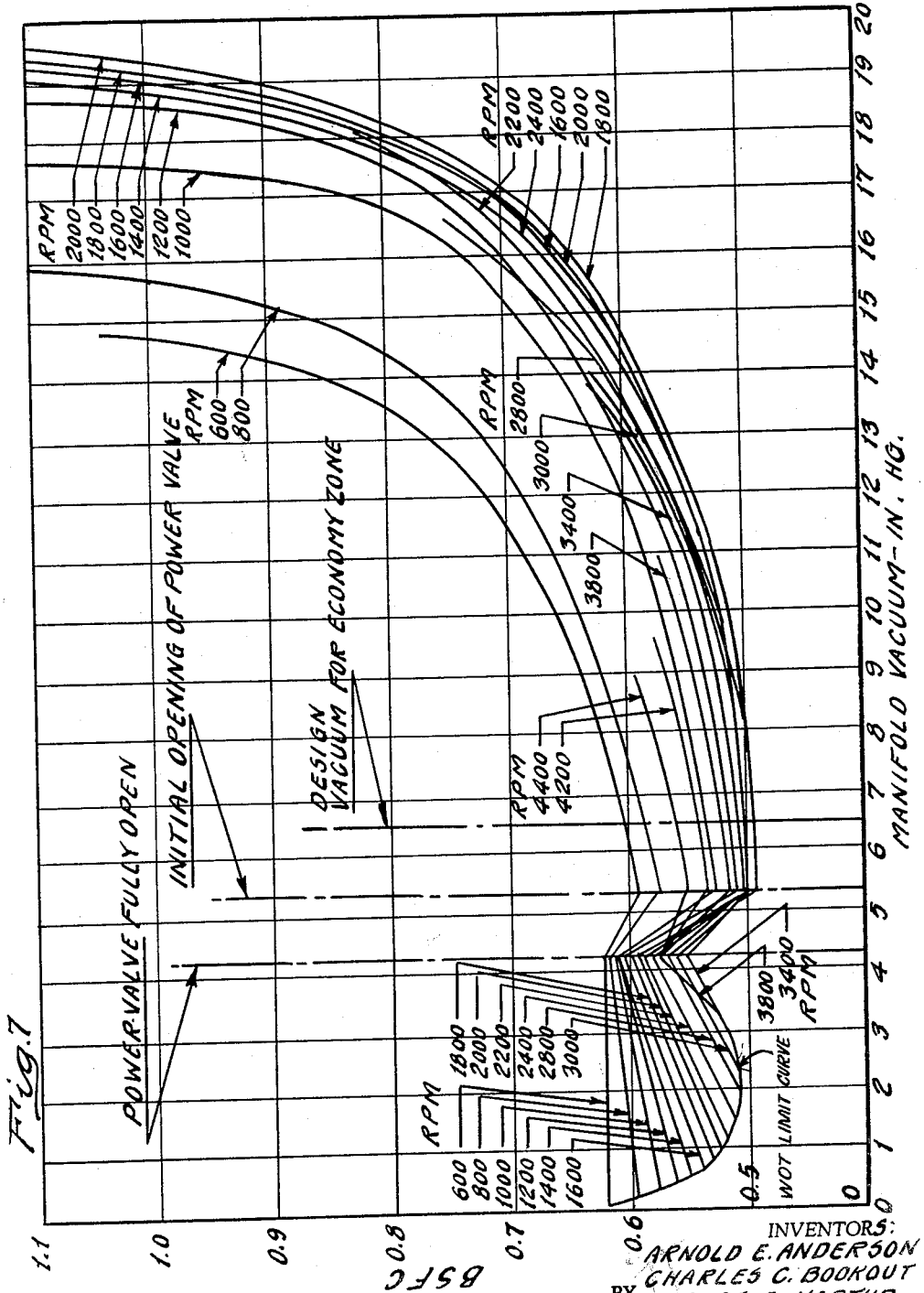

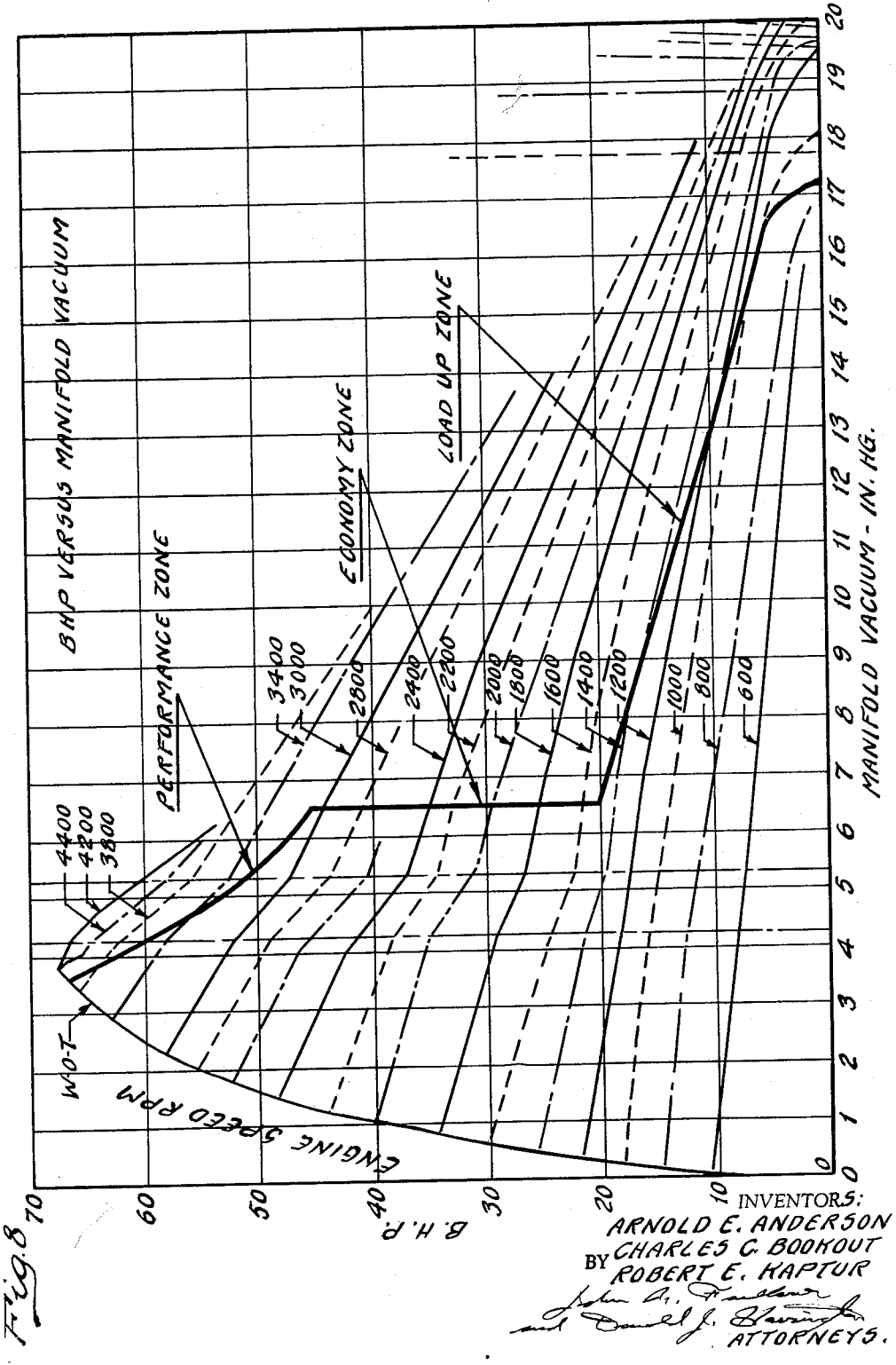

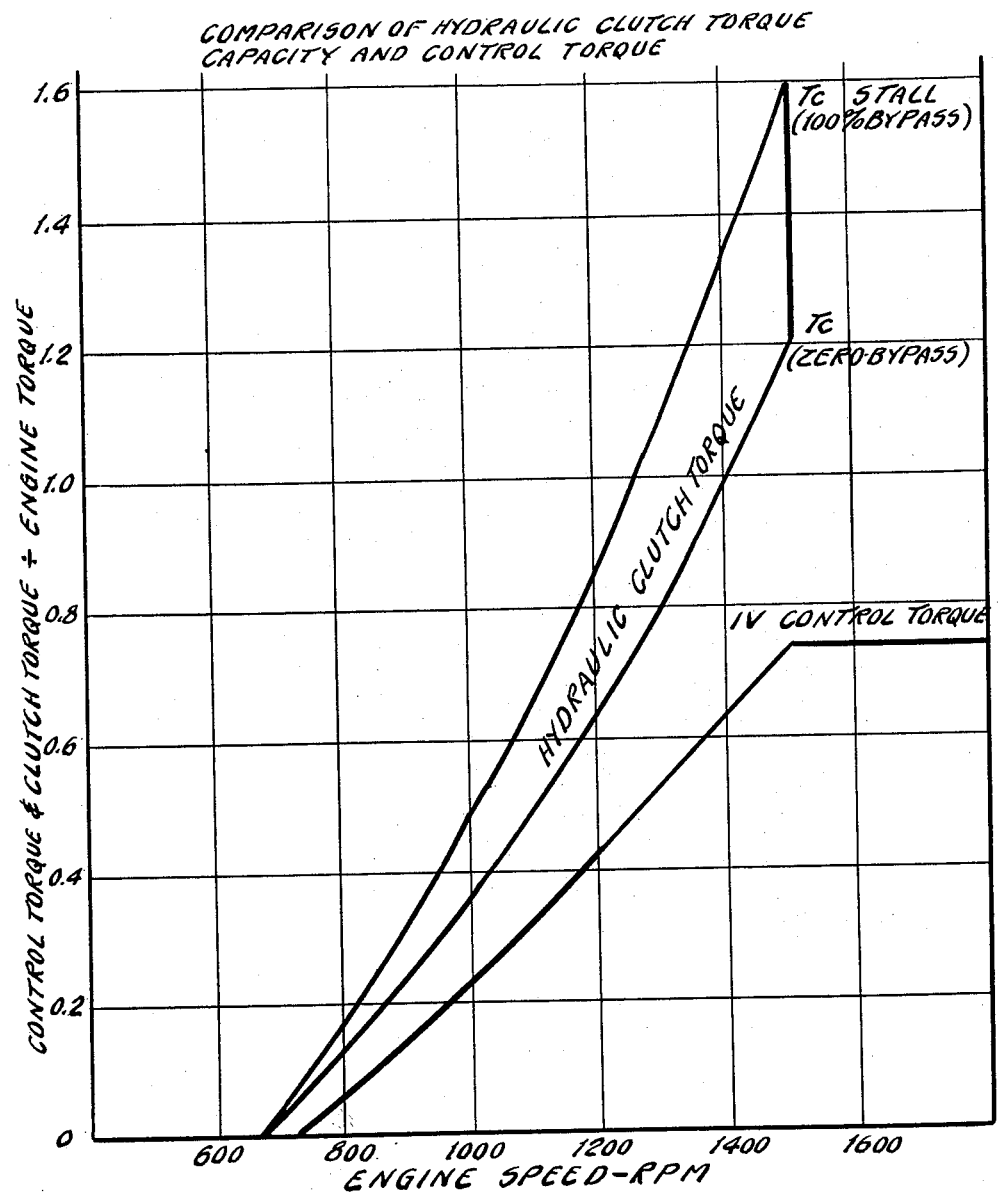

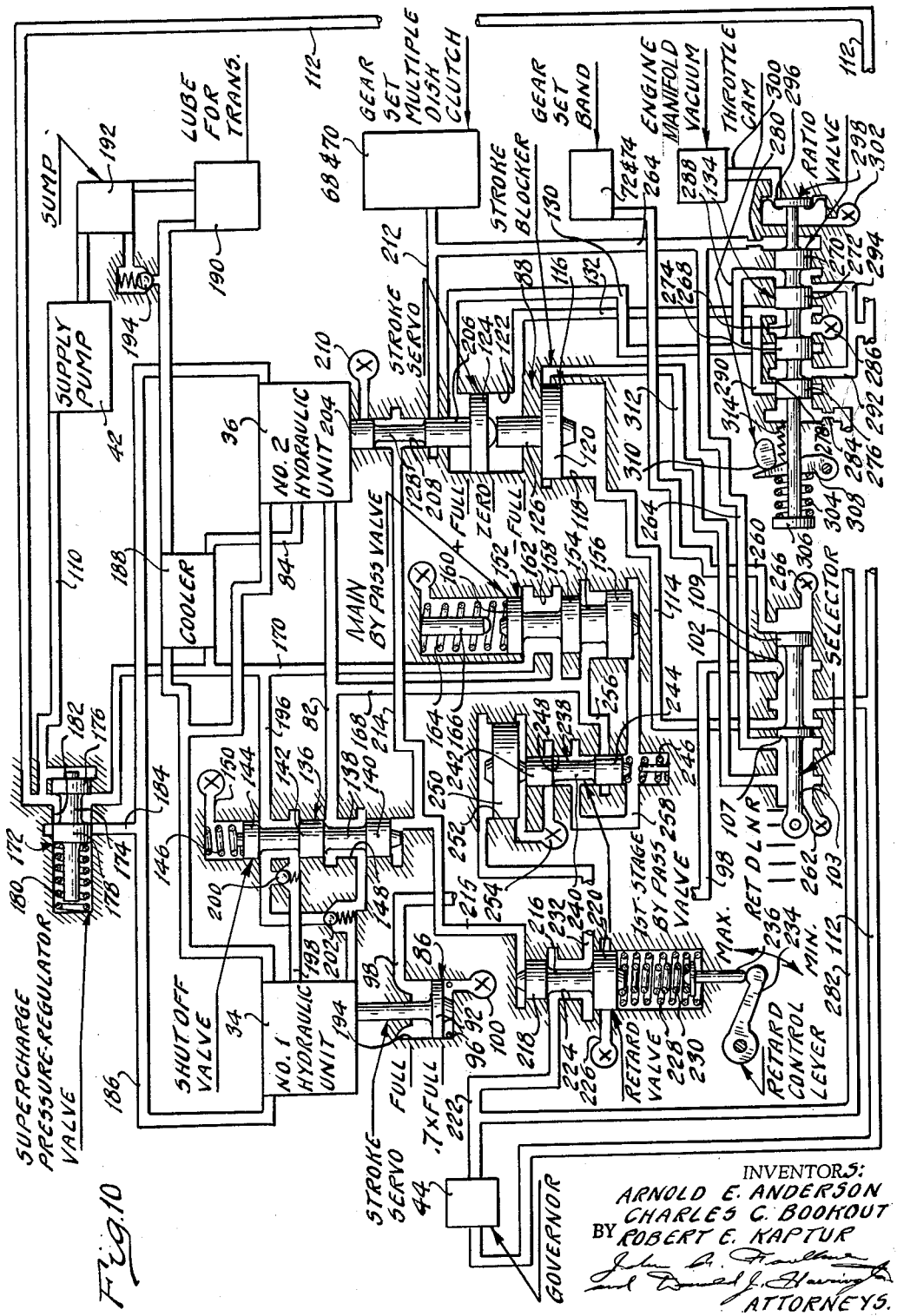

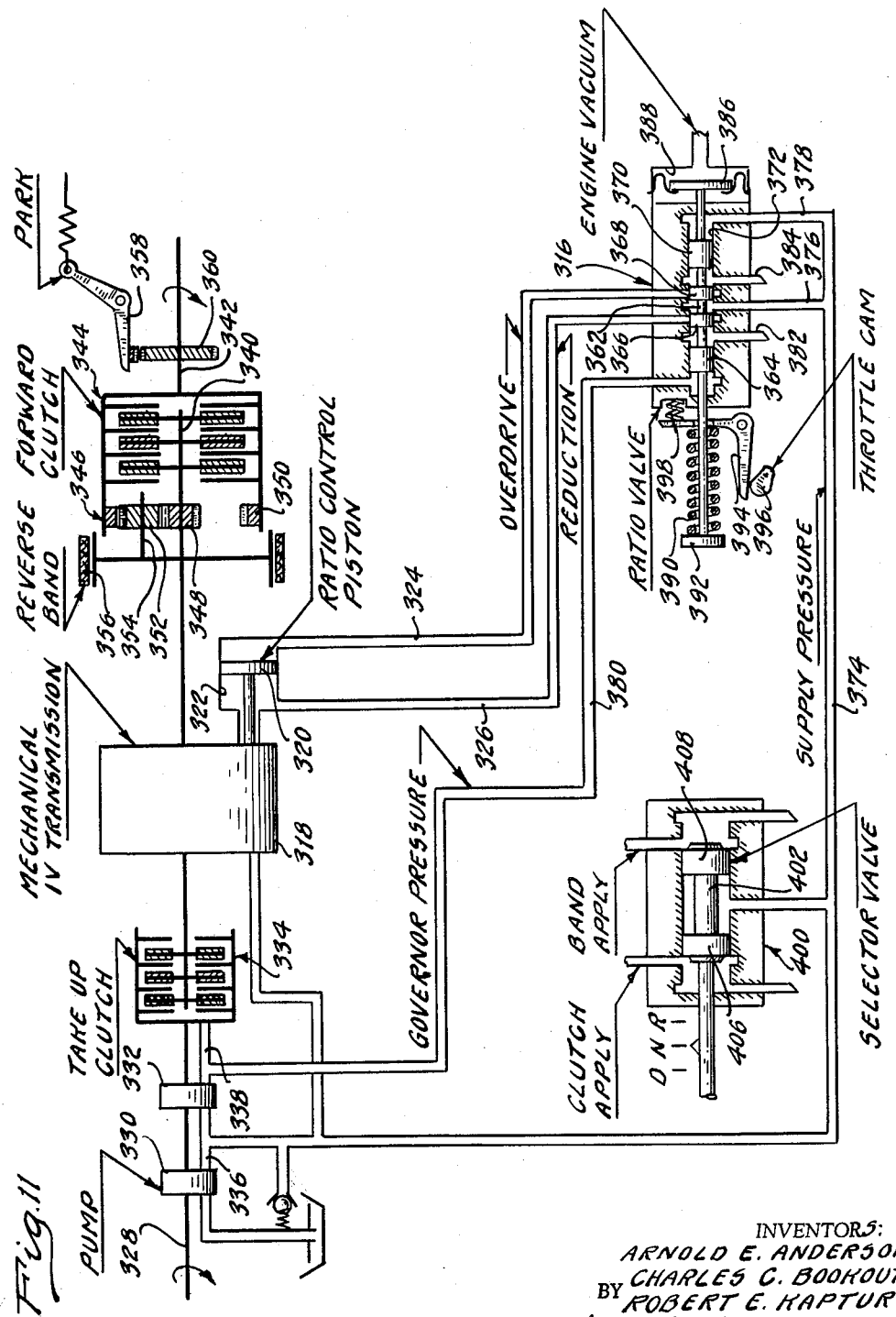

United States Patent Office 3,184,913
Patented May 25, 1965

3,184,913
CONTROL SYSTEM FOR INFINITELY VARIABLE
POWER TRANSMISSION MECHANISM
Arnold E. Anderson and Charles C. Bookout, Livonia, Mich., and Robert E. Kaptur, Birmingham, Mich., assignors to Ford Motor Company, Dearborn, Mich., a corporation of Delaware
Filed Nov. 18, 1963, Ser. No. 324,481
21 Claims. (Cl. 60—19)

Our invention relates generally to infinitely variable power transmission mechanisms, and more particularly to an automatic control system for use with an infinitely variable power transmission mechanism in an automotive vehicle driveline that includes a throttle controlled internal combustion engine. It is capable of being used in an automotive vehicle driveline for accommodating distribution of driving torque from the vehicle engine to the vehicle traction wheels.

The control system of our invention is capable of conditioning the power transmission mechanism for operation in any one of four operating zones. During operation in the first operating zone the driveline provides a smooth take-up as it becomes conditioned for full torque delivery. This is followed by operation in a so-called load-up zone as the effective load upon the engine is increased. This load-up operation continues until the engine operating efficiency approaches a maximum value. Maximum engine efficiency occurs at a reduced engine intake manifold pressure ratio at which the brake specific fuel consumption approaches a minimum value.

Our control system is capable also of establishing optimum driveline economy during sustained operation in a so-called engine economy zone with a minimum brake specific fuel consumption and with a relatively constant intake manifold pressure that corresponds to that operating zone. The provision of a control system that will cause the drive to respond in this fashion is a principal object of our invention.

It is a further object of our invention to provide a control system of the type above set forth wherein provision is made for allowing the drive to assume a performance operating range with a manifold pressure that is less than that which is desired for maximum economy operation but which will produce an increased vehicle accelerating torque in response to an increased torque demand by the vehicle operator.

We contemplate that the principles of our invention can be applied readily to a hydrostatic power transmission mechanism having hydrostatic pump and motor units in a closed hydraulic circuit. Provision is made for varying the relative displacements of the units to provide an infinite variation in ratio. It is another object of our invention to provide an automatic control valve system for use in such a hydrostatic transmission mechanism wherein a hydrostatic control circuit pressure build-up will occur during operation in the so-called take-up operating zone as the transmission mechanism is conditioned for torque delivery thus establishing take-up operation with a maximum degree of smoothness.

It is a further object of our invention to provide an automatic control valve system for a hydrostatic power transmission mechanism of the type above set forth wherein provision is made for loading up the engine during the initial acceleration period without a corresponding change in the transmission speed ratio thus allowing the engine intake manifold pressure to assume a value that corresponds to a minimum brake specific fuel consumption for the engine.

It is a further object of our invention to provide a control system of the type above set forth wherein provision is made for modifying the transmission speed ratio upon a change in the operating torque requirements so that the engine is caused to operate in the so-called economy zone with a substantially constant engine intake manifold pressure.

It is a further object of our invention to provide a control system of the type above set forth wherein provision is made for overruling the operation of the automatic transmission speed ratio controlling elements of the system to obtain maximum torque operation with reduced engine intake manifold pressure.

It is a further object of our invention to provide a hydrostatic power transmission mechanism having pump and motor units in a closed hydrostatic circuit wherein provision is made for locking the units together hydraulically to establish a positive driving relationship between them under steady state road load operation.

It is a further object of our invention to provide a hydrostatic power transmission mechanism of the type above set forth wherein provision is made for establishing a hydrostatic brake with one of the hydrostatic units of the transmission system functioning as a pump. I contemplate that the hydrostatic brake will include a driver controlled valve system for metering the pressurized fluid delivery of the pump during hill braking operation or coast braking so that the degree of braking can be tailored to satisfy the braking requirements.

Further objects and features of our invention will become apparent from the following description and from the accompanying drawings, wherein:

FIGURE 7 is a plot showing the relationship between the brake specific fuel consumption and engine intake manifold pressure for a typical internal combustion vehicle engine as the engine is operated at any one of several operating speeds;

FIGURE 8 shows a plot similar to the plot of FIGURE 5, although brake horsepower is used as an ordinate rather than vehicle carburetor throttle angle;

FIGURE 9 is a plot showing the relationship between the engine speed and the torque that may be transmitted hydrostatically through the equivalent hydrostatic clutch structure defined by the pump and motor units;

FIGURE 10 shows in schematic form a control valve system for the mechanism illustrated schematically in FIGURE 4; and FIGURE 11 shows in schematic form a control system for a mechanical friction drive having infinitely variable characteristics and which includes a ratio valve that is common to the circuit of FIGURE 10.

Figure 1:
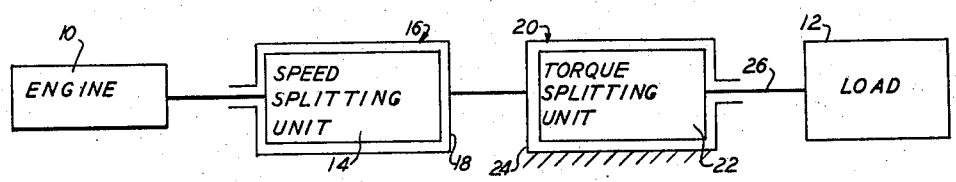
FIGURE 1 shows in schematic form a split-power hydrostatic pump and motor transmission system capable of delivering power from an engine to a load.

Referring first to FIGURE 1, we have illustrated a hydrostatic split-power transmission mechanism capable of delivering torque from an internal combustion, throttle controlled, vehicle engine 10 to a load 12 in an automotive vehicle driveline. The load 12 corresponds to the vehicle traction wheels.

The engine crankshaft is connected drivably to a rotor 14 of a hydrostatic unit 16. The unit 16 includes a rotary casing 18 and is capable of delivering fluid under pressure to a hydrostatic unit 20. For purposes of nomenclature, the units 16 and 20 will be described as a pump and a motor, respectively, although their functions will be interchanged during coasting and hydraulic braking. This motor unit comprises a rotor 22 that is connected mechanically to casing 18 of the pump unit 16. It includes also a casing 24 that is anchored to a relatively fixed housing structure.

The rotor 22 is connected mechanically through a suitable driveline 26 to the load 12.

By preference the pump and motor units 16 and 20, respectively, are situated in a casing that is filled with oil for cooling purposes. The discharge side of the pump 16 is connected to the intake side of the motor 20 and the discharge side of the motor 20 is connected to the intake side of the pump 16 in a conventional fashion to form a closed hydrostatic pump and motor circuit. The unit 16 can be described as a speed splitting unit and the unit 20 can be described as a torque splitting unit. They function to provide split mechanical and hydraulic paths. The speed splitting unit is driven at engine speed but it delivers to the motor unit 20 only the difference between the input and the output speeds. The torque splitting unit, however, delivers only the difference between the input and the output torques. The relative displacement of the torque splitting unit with respect to the speed splitting unit in the arrangement of FIGURE 1 can be varied to provide an overall change in ratio.

Figure 2:
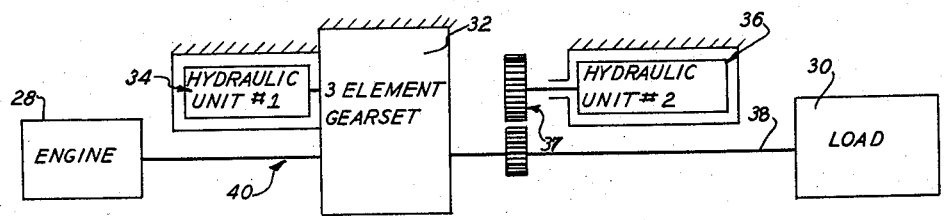
FIGURE 2 is a schematic representation of a hydrostatic power transmission system having split power delivery paths that are defined in part by torque transmitting gear elements.

In the mechanism of FIGURE 2 both casings for the hydrostatic units are anchored. The drive system of FIGURE 2 is capable of delivering driving torque from an internal combustion throttle controlled vehicle engine 28 to a driven load 30 such as the vehicle traction wheels. A first gear reduction 32 is used to deliver driving torque from the engine to the first hydrostatic unit in the form of a pump 34. The casing for the pump 34 is anchored, as already indicated, and a hydraulic circuit is provided for connecting hydraulically the discharge and inlet sides of the pump 34 with the inlet and discharge sides, respectively, for a hydrostatic motor unit 36. The casing for the unit 36 also is anchored as indicated previously.

The rotor for the pump unit 34 is connected mechanically to the engine through the gear reduction 32. The rotor for the motor unit 36 is connected through a gear set 37 to a driven shaft 38, the latter being connected to the load 30. Another element of the gear set 32 is connected directly to the engine 28 through a torque delivery shaft 40.

Although certain features of our invention can be applied to either one of the systems of FIGURES 1 and 2, we have illustrated particularly the system of FIGURE 2 and have adapted it to accommodate the control system of FIGURE 10.

Figure 3:
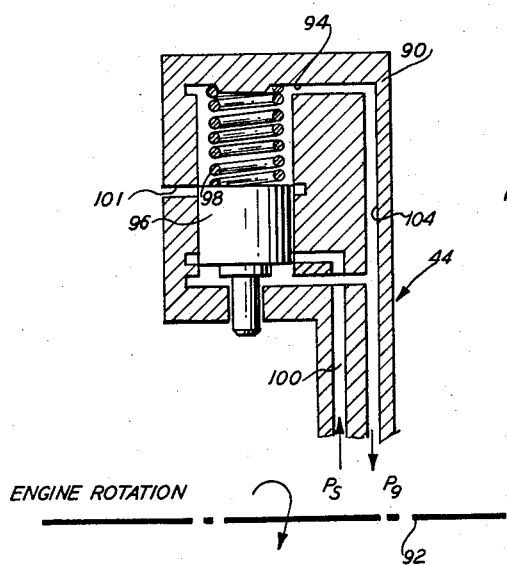
FIGURE 3 is a sub-assembly sectional view of a governor valve assembly for use in a control system embodying the features of our invention.
Figure 4:
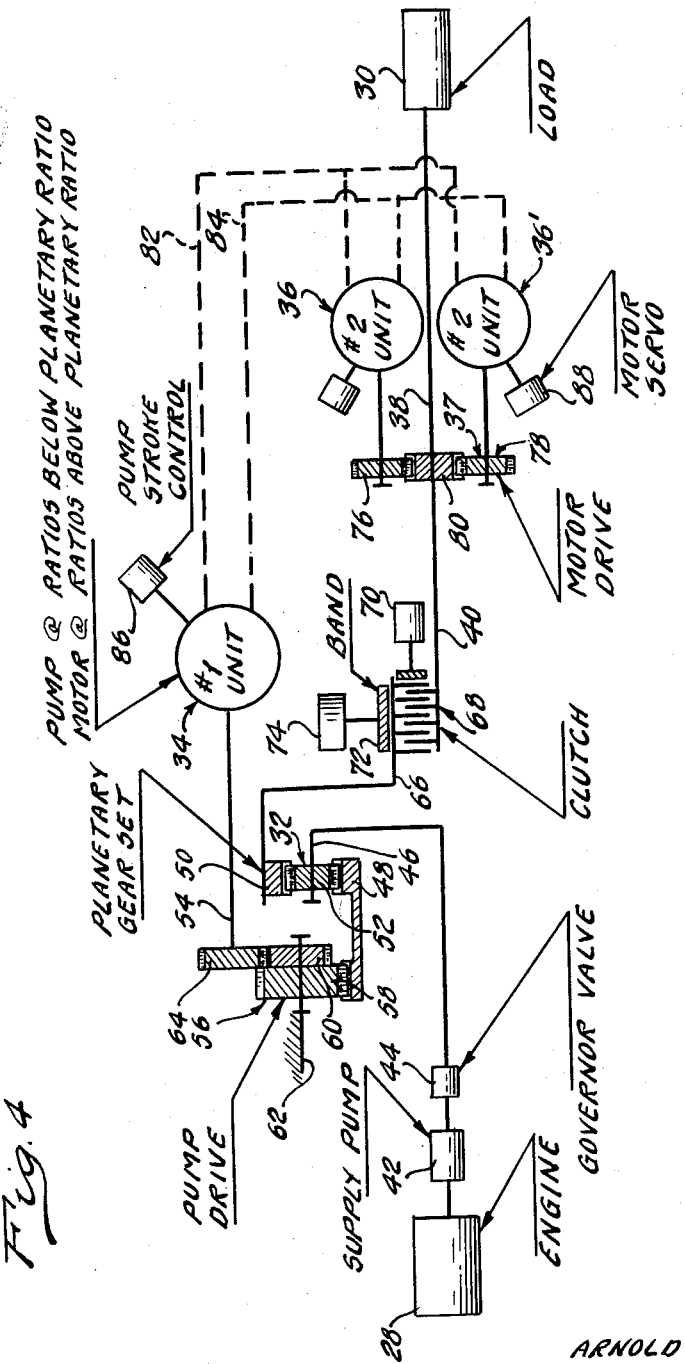
FIGURE 4 is an assembly view in schematic form of a geared, split-speed hydrostatic transmission mechanism that is adapted to be used with the control system of FIGURE 10.

In FIGURE 4 we have illustrated a geared embodiment of the general system outlined in FIGURE 2. Circuit pressure is developed by an engine driven pump 42. It may be connected directly to the engine crankshaft for the engine 28 or it may be connected to the crankshaft through a suitable accessory drive mechanism. A governor valve 44 also is connected positively to the engine crankshaft. The governor valve will be described subsequently with reference to FIGURE 3.

The gear reduction drive 32 includes a carrier 46 that is connected directly to the engine driven crankshaft as indicated. It includes also a planetary sun gear 48 and a planetary ring gear 50. Sun gear 48 and ring gear 50 mesh with planet pinions 52 carried by the carrier 46.

Sun gear 48 is drivably connected to a power input shaft 54 for the hydrostatic pump unit 34 by means of pump drive gears 56. In the arrangement shown, the gears 56 include a first gear element 58 which is geared to the sun gear 48, and a second gear element 60 which rotates with gear element 58. Both gear elements 58 and 60 are journaled upon a stationary carrier 62, the latter functioning as a reaction member. Gear element 60 is geared to a gear element 64 which is connected directly to the shaft 54.

Ring gear 50 is connected to a clutch and brake drum 66. This drum may be connected by means of a multiple disc friction clutch 68 to shaft 40. A suitable clutch apply servo 70 can be provided to engage and disengage the clutch 68.

A friction brake band 72 surrounds drum 66 and may be applied and released selectively by means of a suitable fluid pressure operated brake servo 74 in sequence with the operation of the clutch 68.

The hydrostatic motor unit 36 includes two portions that are identified by the symbols 36 and 36'. A three element gear set is used to connect drivably the units 36 and 36' to the shaft 40. This gear set includes power input gear element 76 which is connected to the rotor of unit 36 and a second power input gear element 78 which is connected to the rotor for the hydrostatic motor unit 36'. A power output gear element 80 is geared to each of the gear elements 76 and 78 and is connected drivably to the shaft 38 as indicated.

The hydrostatic circuit of which the units 34, 36 and 36' form a part includes pressure passages 82 and 84. Passage 82 is connected to the inlet side of each of the units 36 and 36' and to the discharge side of the unit 34. Passage 84, on the other hand, is connected to the intake side of the unit 34 and to the discharge side of the units 36 and 36'.

The displacement of the unit 34 can be changed by means of a stroke adjusting servo 86. This results in a variation in the circuit pressure during low, neutral and reverse operation as will be explained subsequently.

The relative displacement of the units 36 and 36' with respect to the unit 34 can be changed by means of a stroke adjusting, fluid-pressure-operated servo 88. This servo functions to change the effective over-all speed ratio of the transmission system to provide an infinitely variable characteristic.

Referring next to FIGURE 3, we have shown a governor valve assembly that is used in the control system to establish engagement of the engine with respect to the load as the vehicle is accelerated from rest during the initial phase of the acceleration period. This is referred to normally as the so-called take-up phase of the operating range.

The governor valve assembly includes governor valve body 90 which can be connected directly to an engine driven shaft so that it rotates about the axis 92. The radially outward region of the body 90 is formed with a governor valve chamber 94 within which is slidably positioned a governor valve element 96. Valve element 96 is adapted to move radially with respect to the axis 92 in response to centrifugal forces acting thereon. Radially outward movement of the valve element 96 is resisted by valve spring 98.

A pressure supply passage 100 is pressurized by the pump 42. It communicates with the valve chamber 94 at a radially inward region. An exhaust port 101 is located in the intermediate region of the chamber 94.

A governor pressure signal, which is supplied by the valve assembly 44, is distributed through a passage 104. This passage communicates with valve chamber 94 at a radially outward region and at a radially inward region.

Initially the valve element 96 is held in an inward position so that passage 100 normally is blocked. Passage 104 under these conditions is in direct communication with the exhaust port 101. As the valve assembly 44 begins to rotate, the initial preload of the spring 98 will be resisted by the centrifugal force acting upon the valve element 96. At some initial speed the spring preload is overcome and the valve element 96 progressively decreases the degree of communication between passage 104 and exhaust port 101. At the same time the degree of communication between passage 100 and passage 104 is progressively increased. Thus, as the engine speed increases, the pressure signal supplied to passage 104 increases accordingly until a so-called saturation speed is reached. This is the speed at which passage 100 communicates directly with passage 104 while exhaust port 101 is blocked.

The magnitude of the pressure signal made available to passage 104 during the acceleration period increases as the square of the engine speed as the engine speed changes from the initial speed at which the spring preload is overcome to the so-called saturation speed. Thereafter, the pressure in passage 104 remains relatively constant as the engine speed increases further.

The theory of operation of the governor valve mechanism of FIGURE 3 is explained more fully in a copending application of Arnold E. Anderson and Robert E. Kaptur, Serial No. 307,470, filed September 9, 1963. This application is assigned to the assignee of our instant invention.

Figure 6:
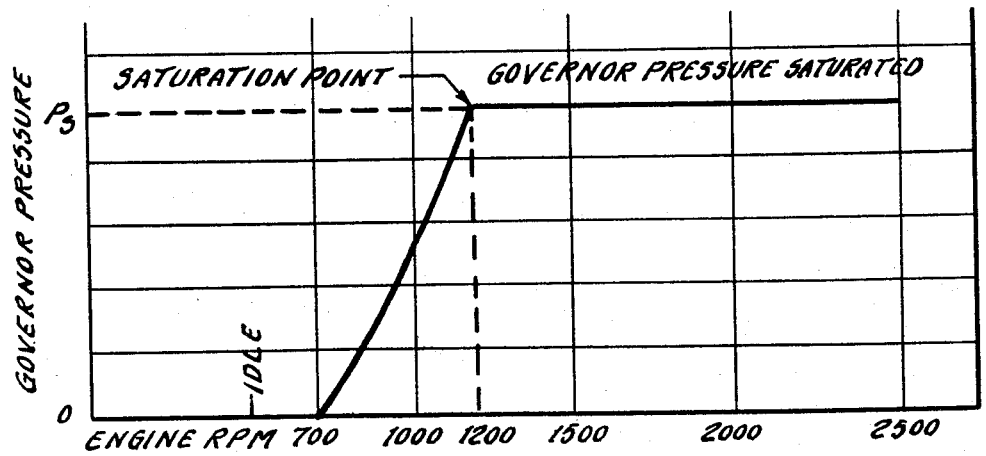
FIGURE 6 is a plot of the governor characteristics for the governor valve mechanism of FIGURE 3.

In FIGURE 6 we have illustrated the characteristics of the governor assembly of FIGURE 3. The engine idle speed may be approximately 500 r.p.m. as indicated. This speed is substantially less than the speed at which the preload of the spring 98 is overcome. When the engine speed reaches approximately 700 r.p.m., the governor valve element 96 begins to regulate from the pressure in passage 100 to produce a resultant pressure signal in passage 104. The magnitude of this signal at any given speed is indicated in FIGURE 6 by the second order curve.

When the speed of the engine exceeds approximately 1200 r.p.m., the pressure in passage 104 is equal to govern apply pressure (supercharge pressure) and the governor valve assembly will have then assumed a so-called saturation condition.

In a vehicle torque delivery driveline the duration of the engagement period of the torque delivery clutch or the equivalent hydrostatic clutch structure engages is dependent upon the engine torque itself. A part throttle start, therefore, has a relatively prolonged engagement period while a full throttle start has a more rapid engagement. The engaging speed for a full throttle start, however, is substantially higher than the corresponding speed for a part throttle start. This characteristic can be observed by referring to FIGURE 6A where we have plotted engine speed versus time for each of three throttle settings. The point at which the equivalent hydrostatic clutch structure becomes fully engaged is indicated in each of the three cases by the term "clutch point."

Figure 6A:
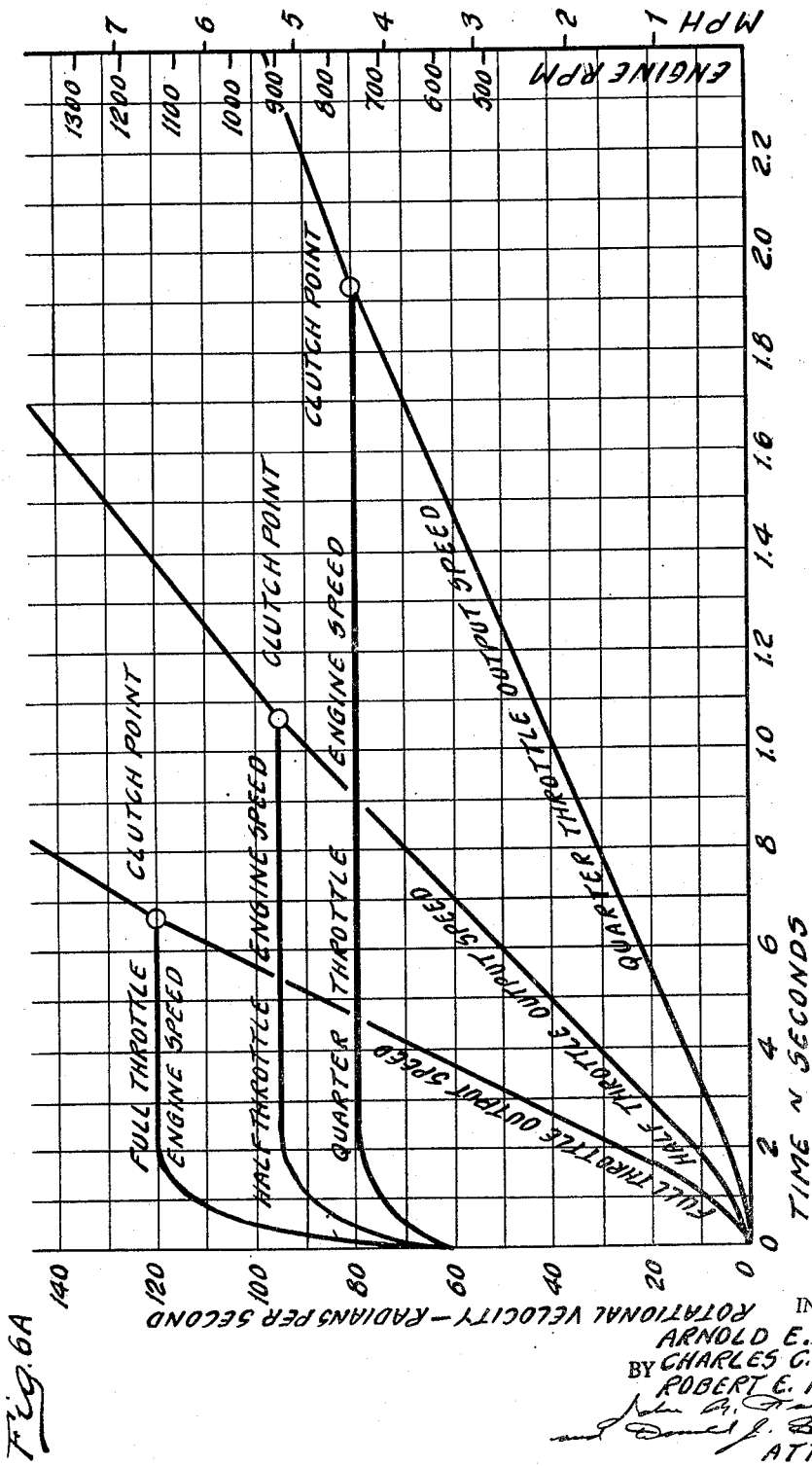
FIGURE 6A is a plot of the equivalent hydrostatic clutch characteristics of the mechanism of our invention.

The output speed of the equivalent clutch structure is plotted in FIGURE 6A along a vertical axis in radians per second.

Our improved control system, following clutch engagement, is capable of carrying out a so-called "engine load-up" phase in the operating range. Under these load-up conditions the engine torque is increased as the engine throttle setting is increased until the engine manifold vacuum assumes a desired value of reduced magnitude. In order to realize fully the economy potential of the internal combustion vehicle engine, a low manifold vacuum is chosen and the system is calibrated accordingly. We contemplate, however, that the engine will include a so-called power valve in the engine carburetor system to provide an enriched fuel-air mixture when vehicle high performance or high acceleration operation is desired. This requires sustained low vacuum operation at higher vehicle speeds and with high engine power output. The economy of the engine, however, is sacrificed in order to obtain this high engine power output. The value of the engine manifold pressure that we have chosen as a so-called economy zone and for which the control system of our invention is calibrated occurs, therefore, at a value that is slightly less than the value that would be necessary to exploit fully the economy potential of the engine. The engine vacuum, therefore, will be maintained at a value that is somewhat greater than that value at which the carburetor power valve will begin to function.

Figure 5:
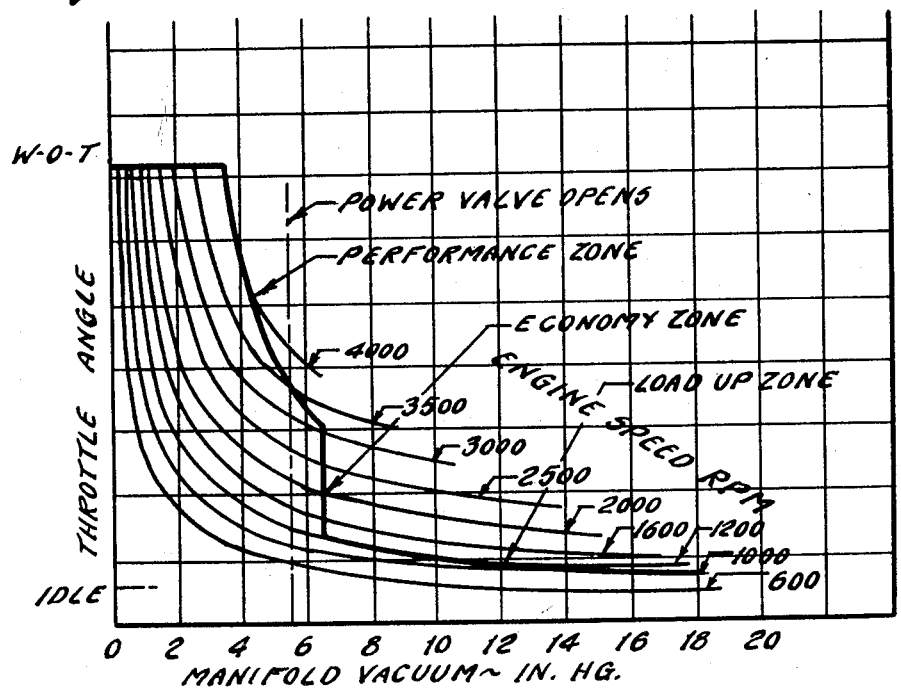
FIGURE 5 is a plot of the operating characteristics of a transmission system embodying the features of our invention. The coordinates in the plot of FIGURE 5 are engine intake manifold pressure and engine throttle position.

Different zones of operation have been illustrated in FIGURE 5. When the governor pressure is not saturated, the control system of our invention will tend to adjust the operating point to a position in FIGURE 5 that corresponds to a higher engine vacuum. At large throttle settings, however, the control will demand a lower engine vacuum.

During operation of the engine in the so-called engine load-up zone, the function of the control system is similar to a conventional engine control system in that an increase in engine throttle angle will cause an increase in engine power and a slight increase in engine speed. It is accompanied also, of course, in a reduction in engine manifold pressure. The load-up zone is effective to satisfy the low speed, low power operating requirements of the vehicle engine. It does this with a minimum amount of engine speed change as in a conventional system.

During operation in the so-called load-up zone, governor pressure acts upon the ratio controlling portion of the system and tends to urge it toward a minimum reduction or maximum speed ratio position. The governor supply pressure, however, opposes the action of the governor pressure. This creates a control force when the governor is unsaturated. Another control force, which in one preferred embodiment may be a calibrated spring force, also acts upon the ratio controlling portion of the valve system to complement the action of the governor pressure. Throughout the operation of the system in the load-up zone the governor and spring forces exceed the opposing control force acting upon the ratio controlling portion of the valve system. As will be explained subsequently, the opposing control force is created by engine intake manifold vacuum. Thus, the control system is urged continuously to its maximum reduction ratio and no ratio changing can occur until the opposing forces become balanced as the hydrostatic equivalent of the torque transmitting clutch becomes effective. This condition is illustrated in FIGURE 9.

It will be observed from FIGURE 9 that the engine load-up process is begun at an engine speed that is slightly greater than the initial speed at which the hydrostatic units become effective for torque delivery.

Our control system is capable of bypassing the fluid delivered by the hydrostatic pump so that it passes to the pump inlet rather than to the hydrostatic motor. The driven speed then is determined by the degree of bypass during operation in the take-up phase and the bypass in turn is controlled in part by the load requirements. If the load is sufficient to stall the vehicle, all of the fluid is bypassed. In the other extreme, the bypass flow will be zero. This variation in the degree of bypass, of course, is influenced by the pressure forces that are proportional to the equivalent clutch torque, but in all instances the magnitude of these pressure forces exceeds the control forces that tend to cause a ratio change to a higher speed ratio.

During operation in the so-called economy zone shown in FIGURE 5, the control forces acting upon the ratio controlling portion of the valve system are calibrated to provide the lowest practical brake specific fuel consumption. As the load upon the driveline varies, a change in the engine vacuum tends to take place. Any change in vacuum is sensed by the ratio controlling portion of the valve system to cause an appropriate adjustment in the transmission speed ratio so that the engine speed will change to provide a restoration in the manifold vacuum to the so-called design value. The transmission system thus is caused to operate continuously in the so-called economy zone with a constant manifold vacuum.

In FIGURE 7 we have illustrated the engine characteristics for a typical internal combustion vehicle engine and have designated by means of a vertical line the so-called design vacuum point. This value is relatively close to the minimum brake specific fuel consumption value for each of the engine speed curves.

If the manifold vacuum decreases to a point at which the carburetor power valve begins to open, the brake specific fuel consumption will increase sharply as indicated in FIGURE 7. This increase continues until the power valve is fully opened. Thereafter, a reduction in the manifold vacuum will correspond to a reduction in the brake specific fuel consumption point until a wide open throttle condition is reached.

The engine carburetor throttle is wide open when the wide open throttle limit-curve is reached.

In FIGURE 8 we have illustrated an engine performance curve in which the variables are manifold vacuum and brake horsepower rather than manifold vacuum and throttle position. The so-called load-up zone, the economy zone and the performance zone can be illustrated readily in FIGURE 8 as they have been in FIGURE 5. During operation of the transmission mechanism in the so-called take-up phase, the operating point will always be to the left of the performance curve shown in FIGURE 8. The transmission system assumes a constant maximum reduction ratio during operation in the take-up phase. When the driveline control system is functional, however, the operating point will fall upon the performance curve illustrated in FIGURE 8.

It is possible under certain conditions for the operating point to move to the right of the performance curve illustrated in FIGURE 8. This occurs during operation of the transmission mechanism in a so-called lock-up condition. In this instance the fluid communication between the hydrostatic units is interrupted to provide a fluid lock so that the torque is transmitted substantially mechanically from one unit to the other with no flow between them. The transmission control system under these conditions tends to adjust the hydrostatic units to the maximum overdrive position.

Any operating point on the right-hand side of the control curve of FIGURE 8 will tend to produce a change in the engine manifold vacuum that will provide an error signal to the ratio controlling portions of the mechanism to increase the transmission speed ratio. If the operating point lies on the left-hand side of the operating curve of FIGURE 8, however, the error signal that is produced tends to cause the control system to produce a decrease in the speed ratio.

Referring next to FIGURE 10 we have illustrated a valve system capable of controlling the mechanism of FIGURE 4. In FIGURE 10 the first hydraulic unit 34 can be in the form of a variable displacement pump of any of several conventional designs. These can include an adjustable swash plate pump or variable stroke piston pump with an eccentric cam ring. Such variable displacement pumps are well known to persons skilled in this art and the details of their construction thus need not be described in this specification.

Connected to the stroke controller of the pump 34 is a stroke servo piston 92 which forms a part of the control 86 described with reference to FIGURE 10. Piston 92 is received within a servo cylinder 194 and normally is urged toward a full stroke position by means of a servo spring 96. The upper portion of the piston 92 is pressurized with supercharge pressure which is distributed to the cylinder 194 through a pressure passage 98 from the selector valve. The lower region of cylinder 94 is exhausted through an exhaust port 100.

Passage 98 communicates with a valve chamber 102 within which is positioned slidably a manual selector valve element 103. The valve element 103 is formed with two spaced valve lands 107 and 109 which cooperate with internal valve lands formed in the chamber 102.

Pressure from supply pump 42 is distributed through a pump discharge passage 110 to a passage 112, the latter extending to the valve chamber 102 at a point intermediate the valve lands 106 and 108.

Valve element 103 can be moved to any one of five positions that are designated in FIGURE 10 by the symbols RET, D, L, N and R. These symbols identify the positions that respectively correspond to hill retard, drive, low, neutral and reverse. In FIGURE 10 the valve element 104 is shown in a so-called neutral position. When it is positioned in this fashion, communication is established between passage 112 and passage 98 through the valve chamber 102. Thus, the piston 92 of the control 86 is moved in a downward direction to a position corresponding to a portion of the maximum displacement of the hydraulic pump unit 34.

Communication also is established between the passage 112 and a passage 114 through the valve chamber 102. Passage 114 in turn extends to a stroke blocker 116 for the hydraulic units 34, 36 and 36'. This blocker includes a cylinder 118 within which is positioned a piston 120. Supercharge pressure in passage 112 thus is distributed to the lower surface of the piston 120 thereby causing the piston to assume the upper position shown in FIGURE 10.

A stroke servo for the hydraulic unit 36 is identified generally by reference character 88. It includes a cylinder 122 within which is positioned servo piston 124. This piston is engaged by a stem 126 carried by the blocker piston 120 when the latter assumes the upper position shown in FIGURE 10. This position of piston 120 corresponds to the zero stroke condition for the unit 36. Piston 124 is connected to the stroke controlling portions of the unit 36 through a mechanical connection that is defined in part by a sliding shuttle valve element 128.

Stroke control pressure is distributed to the cylinder 122 on the upper side of piston 124 through a passage 130. Control pressure is distributed to the lower portion of the cylinder 122 through a passage 132. Both passages 130 and 132 communicate with a ratio valve 134 which will be described subsequently.

The discharge side of the pump 34 communicates with the intake side of the units 36 and 36' through the passage 82. This passage communicates with a shutoff valve 136 which comprises a valve spool 138 having three spaced valve lands 140, 142 and 144. Valve element 138 normally is biased in a downward direction by a valve spring 146. Valve element 138 is slidably situated within a valve chamber 148 having internal valve lands that cooperate with the valve lands 140, 142 and 144.

The upper end of the chamber 148 is exhausted through an exhaust port 150.

When the valve element 138 assumes the position shown, passage 82 communicates directly with the discharge side of the pump 34.

A low pressure main bypass valve 152, which may have a pressure ratio of 4:1, is situated in parallel relationship with respect to the hydraulic units. It includes a multiple land valve spool 154 having spaced valve lands 156, 158 and 160. These are slidably situated within cooperating internal valve lands formed by a cylindrical valve chamber 162. Valve element 154 normally is urged in a downward direction as seen in FIGURE 10 by a valve spring 164. The upper limiting position for the valve element 154 is determined by a stop 166.

A branch passage 168 connects passage 82 with the chamber 162 at a location adjacent valve land 158. Communication is established through the annular space between valve lands 158 and 160 between passage 168 and a lower pressure supercharge pressure passage 170. Passage 168 communicates also with the region of the valve chamber 162 intermediate the valve lands 158 and 156. Valve land 156 is formed with a diameter that exceeds the diameter of valve land 158 thus creating an area differential that is acted upon by the pressure in passage 168 to urge normally the valve element 154 in a downward direction, as viewed in FIGURE 10.

A pressure regulator valve for regulating the supercharge pressure in passages 112 and 170 is shown at 172. It includes a valve spool 174 having spaced valve lands 176 and 178. Valve spool 174 normally is urged in a right-hand direction, as viewed in FIGURE 10, by a valve spring 180. Lands 176 and 178 are slidably situated within internal valve lands formed by a valve chamber 182. The pressure in passage 110 and passage 112 is distributed to the right-hand side of valve land 176 thereby creating a pressure force that opposes the force of spring 180. A low pressure port 184 communicates with the chamber 182 at a point adjacent the land 178. Valve element 174 thus regulates the pressure in passage 112 at a substantially constant value that is dependent upon the calibration of the spring 180.

Pressure port 184 communicates with a cooling and lubrication oil passage 186 which extends to the interior of the housing for hydraulic unit 34 and hydraulic units 36 and 36'. It communicates also with an oil cooler 188 and with a lubrication circuit identified generally by reference character 190. The fluid then passes from the circuit 190 to a transmission sump 192 which in turn is in fluid communication with the intake side of the supply pump 42.

The casings for the hydraulic units 34 and 36 and 36' may be maintained filled by the supply oil furnished by the passage 186. The magnitude of the pressure in passage 186 and in the casings cannot exceed a predetermined low volume, which is controlled by a ball check relief valve 194.

Passage 170 communicates with a passage 196 which in turn communicates with a passage 198 through the annular space provided by the shutoff valve lands 142 and 144. A one-way check valve 200 provides one-way fluid communication between passage 196 and passage 198. The transfer of fluid from passage 198 to passage 196 is inhibited. Another one-way check valve 202 provides one-way fluid communication between passage 196 and the discharge side of the hydraulic unit 34 although fluid transferred from the hydraulic unit 34 to passage 196 is inhibited.

Valve element 128 is formed with two valve lands 204 and 206 which are slidably situated within internal valve lands defined by a circular valve chamber 208. An exhaust port 210 communicates normally with the chamber 208. The supercharge pressure passage 212 communicates with chamber 208 adjacent valve land 206. When the piston 124 assumes a zero stroke position as it engages the stem 126, communication is established between passage 212 and a crossover passage 214. This passage communicates with the lower region of chamber 148 and distributes pressure to the lower end of land 140 thus creating a force that opposes the force of spring 146. The condition exists during lock-up drive operation and during hill retard as will be explained subsequently.

Crossover passage 214 communicates also with hill retard pressure regulator valve 216 having a pair of spaced valve lands 218 and 220. Land 220 is of greater diameter than land 218 and the differential area defined thereby is subjected to governor pressure through governor pressure passage 222 which communicates with the hill retard valve chamber 224 at a point intermediate the lands 218 and 220. Chamber 224 defines internal valve lands that cooperate with lands 218 and 220.

An exhaust port 226 communicates with a chamber 224 at a location adjacent land 220.

Whenever passage 214 is pressurized, the pressure force acts upon valve land 216 to urge it in a downward direction against the opposing influence of valve springs 228 and 230. Valve 216 thus acts as a regulator valve which modifies the pressure in governor pressure passage 232, the latter communicating with the chamber 224 at a location between lands 218 and 220. When the valve 216 assumes the position shown, free communication is established between passages 222 and 232. When passage 215 is pressurized, however, land 218 normally tends to block passage 222 and land 220 normally tends to open passage 232 to exhaust port 226. The operator, however, can supplement the action of spring 228 by moving a hill retard lever 234 in a counterclockwise direction, as viewed in FIGURE 10, thereby moving spring plunger 236 in an upward direction to compress spring 230. This tends to restore the pressure in passage 232, the magnitude of the pressure being dependent upon the position of the lever 234.

It will be observed that the main bypass valve functions normally to bypass fluid pressure from passage 168 to the passage 170. During operation the magnitude of the pressure in passage 168 may be as a high as 5,000 p.s.i. whereas the pressure that is maintained by the supercharge regulator valve of passage 170 is only approximately 60 p.s.i. Thus, a substantial pressure drop must be accommodated. This normally will tend to create an unstable condition for the bypass valve due to the extreme fluid flow forces that are established. For this reason we have provided an amplifier valve in the system that is designated as a first stage bypass valve 238. This valve includes a valve element 240 having spaced valve lands 242 and 244. Element 240 normally is urged in an upward direction, as viewed by FIGURE 10, by a valve spring 246. Element 240 is slidably situated within a valve chamber 248 having internal valve lands that cooperate with the lands 242 and 244.

Governor pressure in passage 232 acts upon a relatively large diameter spool 250 slidably situated within a chamber 252 located at the upper end of the chamber 248. The lower portion of chamber 252 is exhausted through an exhaust port 254.

Line pressure in passage 168 is distributed to chamber 248 through a passage 256 which normally is blocked by land 244. The pressure in passage 232 increases, however, when communication is established progressively between passage 256 and a crossover passage 258, the latter communicating with the lower end of the valve chamber 248 as well as with the lower end of valve chamber 162 and the main bypass valve. The exhaust port 254 also communicates with chamber 248 and communication between this port and passage 256 is decreased progressively as the pressure in passage 232 increases. Thus, the valve 238 acts as an amplifier for the signal in passage 232. The amplified signal then is transmitted to the lower end of the land 156. The main bypass valve thus can be calibrated for operation with higher pressures without an undesirable unstable condition resulting.

To establish reverse drive operation, the manual valve is shifted to the R position. This causes land 108 to uncover a passage 260 which extends to the servo 74 for the brake band 72. Passage 112 is brought into direct communication through the valve chamber 102 with the passage 260. At the same time land 106 on the selector valve element 104 uncovers passage 114 thereby establishing a direct connection between passage 114 and an exhaust port 262. This causes the pressure on the lower side of blocker 116 to become exhausted. This allows the stroke servo 88 to move to the negative displacement position thereby allowing the hydraulic units 36 and 36' to assume a negative displacement position. They thus are driven in a reverse direction by the pump 34 the moment disc clutch 68 is disengaged under reverse drive conditions. The drive then is entirely hydrostatic with all of the power being delivered hydrostatically from the engine to the load.

The multiple disc clutch 68 and the servo 70 communicate with a clutch pressure feed passage 264 which in turn communicates with valve chamber 102 at a location adjacent land 106. When the valve element 104 assumes the neutral and reverse positions, passage 264 is uncovered by land 106 and communication is established with exhaust port 262.

It should be observed that when the valve element 104 assumes any position other than the reverse position, communication is established between passage 260 and exhaust port 266 located at one end of the chamber 102. Thus, the reverse brake band remains disengaged under all driving conditions except reverse drive.

The reverse brake band 72 anchors ring gear 50 so that the latter acts as a reaction member during reverse drive operation. Power is distributed to the hydrostatic unit 34 from the engine through the gear drive 56 and the planetary gear unit 32. The power then is distributed fully hydrostatically to the units 36 and 36'.

The adjustment of the hydraulic units 36 and 36' between the zero displacement condition and the maximum positive displacement position is controlled by means of the ratio valve 134. This valve includes valve spool 268 having four spaced valve lands 270, 272, 274 and 276. These lands are slidably situated within cooperating internal valve lands defined by a valve chamber 278.

Passage 264 is pressurized with governor supply pressure whenever the selector valve 104 assumes the low range position, the drive position or the retarded position. The pressure in this passage is distributed to the right-hand side of valve land 270 through an orifice 280. This creates a pressure force that tends to urge normally the valve element 268 in a left-hand direction. Governor pressure in passage 222 is distributed through a governor pressure feed passage 282 to the left-hand side of the valve land 276. A suitable stabilizing orifice 284 can be provided in this passage.

Exhaust port 286 communicates with the chamber 278 at a point intermediate the lands 274 and 272.

Passage 130 includes a branch portion 288 which communicates with the chamber 278 at a location adjacent land 270. Passage 132 includes a branch portion 290 which communicates with chamber 278 at a location adjacent land 276. Passage 112 includes branch portions 292 and 294 which communicate with the chamber 278 adjacent lands 274 and 272.

The forces acting upon the valve element 268 thus tend to control the degrees of communication between passage 112 and each of the passages 130 and 132. They control also the degrees of communication between exhaust port 286 and each of the passages 130 and 132. As the forces acting upon the valve element 268 in a left-hand direction increase, the stroke controller 88 tends to move the hydraulic units 36 and 36' to the maximum reduction position. On the other hand, if the forces acting upon the valve element 268 tend to adjust it in the right-hand direction, as viewed in FIGURE 10, the transmission system tends to assume a high speed ratio position.

During the take-up portion of the operating phase, the pressure passage 282 is insufficient to overcome or balance the pressure in passage 264. Thus, the valve element 268 is urged to a maximum reduction position. No automatic ratio changing can occur until after the equivalent hydrostatic clutch is engaged.

Valve element 268 is connected to a flexible diaphragm 296 which forms a part of the vacuum servo 298. One side of diaphragm 296 is in communication with the engine intake manifold through a manifold pressure passage 300. The other side of the diaphragm 296 is vented to atmosphere through an exhaust port 302. Thus, as the engine manifold vacuum decreases, there is a tendency for the valve element 268 to be shifted in a left-hand direction to increase the speed reduction. This causes an increase in engine speed which, of course, causes an increase in manifold vacuum. This tends to restore the force balance for the ratio valve 134.

A control spring 304 is situated between the spring seat 306 carried by the valve element 268 and a driver controlled lever 308. This lever can be adjusted by means of a cam linkage mechanism 310 that is connected mechanically to the engine carburetor throttle. The control spring 304 and the servo 294 are calibrated so that the lowest practical brake specific fuel consumption point for the engine will be maintained during operation in the so-called economy zone described with reference to FIGURES 5 and 8.

If the operator desires to condition the mechanism for operation in the so-called performance zone shown in FIGURES 5 and 8, he may adjust the engine carburetor throttle to approach a wide open throttle setting. This causes the lever 308 to back off, thereby decreasing the tension in spring 304. This, of course, allows the engine to operate at an intake manifold pressure that differs from the design value that is chosen for minimum brake specific fuel consumption. The torque for the engine, however, increases. The carburetor power valve begins to function at this time. Increased vehicle performance considerations thus becomes dominant over the maximum fuel economy considerations.

Operation in the low speed range is obtained by moving the valve element 104 to the L position. This causes passage 98 to become pressurized as it is brought into communication through the chamber 102 with the supercharge pressure passage 112. This causes the stroke control 86 to move the hydrostatic pump 34 to the position corresponding to a reduced displacement. This in turn results in an increase in line pressure in passage 82 for a given engine torque. High torque operation thus is made possible.

It should be noted that passage 98 is pressurized if valve element 104 is moved to the reverse R position. Thus, an increase in line pressure is experienced also during operation in reverse drive.

During operation in low, as well as in the drive range D the displacement of the hydraulic units 36 and 36' is determined by the operation of the ratio valve 134.

If it is assumed that the operator shifts the selector valve element 104 to the drive range position D, the hydraulic units 36 and 36' initially will assume a full positive displacement position. This is due to the fact that both passages 132 and 130 become pressurized with stroke control pressure. Following completion of take-up, the ratio control valve begins to regulate the displacement of the hydraulic units 36 and 36' by varying the relative pressures in passages 130 and 132' in response to manifold pressure errors that are sensed by the ratio valve as the engine speed and load change. If the displacement of the hydraulic units 36 and 36' approaches zero, it is possible for a locked-up condition to occur. Displacement of hydraulic units 36 and 36' beyond the zero displacement position and into the negative displacement range cannot occur by reason of the fact that the stroke blocker 116' remains pressurized. This is due to the fact that passage 114 is in continuous communication with the passage 112 whenever the selector valve element is in the retard position, the neutral position N or the drive position D.

When the displacement of units 36 and 36' becomes zero, valve land 206 uncovers passage 212 thereby permitting pressure distribution from passage 212 to the passage 214. This causes the shutoff valve element 138 to assume an upward position thereby blocking passage 82. No flow then can occur between the hydraulic unit 34 and the hydraulic units 36 and 36'. The power flow paths then are entirely mechanical and no power is distributed hydrostatically. At the same time the retard valve element 216 is urged in a downward direction under the influence of the supercharge pressure in passage 214. This causes passage 232 to be exhausted through port 226. When lock-up occurs the hydraulic unit 34 is at full stroke and it operates at a minimum speed. It functions, therefore, as a reaction member and prevents rotation of sun gear 48. Thus, the ring gear 50 and the shaft 40 are overdriven.

To establish hill retard operation, the clutch 68 remains applied. Hydraulic pump 34 remains at a full stroke position and the hydraulic units 36 and 36' assume a fully negative displacement position. This is accomplished by pressurizing the upper end of the blocker chamber 118. Passage 312 is provided for this purpose. This passage communicates with the annular selector valve chamber 102 at a location directly adjacent port 262. Land 106 uncovers passage 312 and establishes communication between passage 112 only when the element 104 assumes the retard position RET. The units 36 and 36' thus are allowed to assume a full negative displacement position. The passage 212 again is brought into communication with passage 214 so that the retard valve element 216 again assumes a regulating position. This passage communicates with the manual selector valve in passage 232 thus can be controlled by appropriately controlling the position of the lever 234. This, of course, allows the operator to control the magnitude of the amplified pressure in passage 258. The degree of bypass provided by the valve spool 152 thus can be made to be dependent upon the position of the retard control lever 234. As the retard control lever is advanced, the magnitude of the pressure in passage 215 is increased and this, of course, increases the degree of restriction between passage 168 and passage 170. Thus, the magnitude of the control pressure in passage 82 and in passage 168 can be controlled and braking can be obtained as the valve spool 154 is caused to assume a position that corresponds to an increased flow resistance.

If desired, a driver controlled feel spring 314 can be provided between the lever 308 and a stationary portion of the valve body. Thus, as the control enters the performance zone the driver will experience a detent feel as he adjusts the engine carburetor throttle linkage to the advanced engine throttle setting.

In FIGURE 11 we have shown an engine vacuum controlled ratio valve of the type illustrated in FIGURE 10 although it is adapted for use in a control system for an infinitely variable mechanical drive such as a friction disc drive. Reference may be made to Patent No. 3,094,203 for an illustration of a typical disc drive system capable of accommodating the valve system of FIGURE 11.

The ratio valve of FIGURE 11 is identified by reference character 316 and a mechanical drive is shown at 318. The ratio of the drive 318 can be controlled by means of a ratio control piston 320. This piston is slidably situated within a control cylinder 322 and fluid pressure can be distributed to either side thereof through passages 324 and 326. When the pressure in passage 324 increases relative to the pressure in passage 326, the piston 320 is urged to an overdrive position. In contrast, as the pressure ratio changes in the opposite direction, the piston 320 will be urged in a right-hand direction thereby increasing the speed reduction of the drive 318.

An internal combustion vehicle engine can be connected to power input elements of the drive 318 through an engine driven shaft 328. A positive displacement supply pump 330 can be drivably connected to the shaft 328. A governor valve 332 of the type illustrated in FIGURE 3 is drivably connected to the shaft 328.

The power input elements of the drive 318 are adapted to be connected to the shaft 328 by means of a take-up clutch 334. For a particular description of this clutch and its relationship to the governor valve, reference may be made to the co-pending application of Arnold E. Anderson and Robert E. Kaptur, Serial No. 307,470. This application may be used for purposes of supplementing this disclosure.

The take-up clutch 334 responds to governor pressure made available by the governor valve 332. It modulates the pressure from passage 336 which is connected to the discharge side of the pump 330. The resultant pressure due to this pressure modulation is distributed to the take-up clutch through a passage 338 to effect its engagement over a period of time that is dependent upon the magnitude of the torque being delivered. The governor and take-up characteristics for the take-up clutch 334 is similar to that which is shown in FIGURE 6 and in FIGURE 6A.

The power output element of the drive 318 may be connected to a power output shaft 340, and this shaft in turn can be connected to a load shaft 342 by means of a forward clutch 344. This clutch can be controlled in any conventional manner.

To establish reverse drive a planetary reverse gear 346 can be employed. This may include a sun gear 348 connected to the shaft 340 and a ring gear 350 connected to the load shaft 342. Planet pinions 352 carried by carrier 354 drivably engage sun gear 348 and the ring gear 350. A reverse brake band 356 can be employed to anchor the carrier 354 so that the latter acts as a reaction member. During reverse drive the clutch 344, of course, acts as in reverse drive. The clutch 344 is released during reverse drive.

A parking pawl 358 and a cooperating parking gear 360 can be used to establish a park condition.

The ratio valve 316 includes a valve spool 362 having spaced valve lands 364, 366, 368 and 370. These are slidably positioned within cooperating internal valve lands formed in a valve chamber 372. Supply pump 344 distributes pressure to a supply pressure passage 374 which communicates with the chamber 372 at spaced locations by means of branch passages 376 and 378. Governor pressure from the governor valve 332 is distributed through a governor pressure passage 380 to the left-hand side of the valve land 364. The pressure force thus established on the valve element 362 is opposed by the control pressure force acting on the right-hand side of the valve land 370.

Exhaust ports 382 and 384 communicate with the valve chamber 372 at locations adjacent valve lands 366 and 368, respectively.

Valve element 362 is connected to a diaphragm 386 which cooperates with a vacuum servo 388 to define a pressure cavity that is in communication with the engine intake manifold. As the engine intake manifold vacuum decreases, the resultant pressure acting upon the diaphragm 386 tends to allow the valve element 362 to be urged in a left-hand direction. This, of course, results in an increased degree of communication between passage 374 and passage 326 while the degree of communication between passage 324 and the exhaust port 384 is increased. This results in an increase in pressure in passage 326 relative to the pressure in passage 324 which tends to urge the drive to a reduction condition. Conversely, upon an increase in the engine intake manifold vacuum, the valve element 362 will tend to be urged in a right-hand direction thereby causing an increase in the pressure in passage 324 relative to the pressure in passage 326. This tends to urge the drive 318 to an increased speed ratio condition.

Upon an increase in the reduction ratio in drive the engine speed increases. This, of course, causes an increase in the manifold vacuum and hence the forces acting in a right-hand direction upon the valve element 362. This again restores the force balance of the ratio valve after the ratio control piston 320 has assumed its new position.

The forces due to the engine intake manifold vacuum are opposed and balanced by a control spring force created by the spring 390. This spring is seated upon a spring seat 392 carried by the valve element 362. It is interposed between seat 392 and a control spring lever 394.

An engine carburetor throttle valve linkage mechanism is mechanically connected to a throttle cam 396 and when the operator desires to enter the performance zone the cam 396 is actuated thereby allowing the lever 394 to back off to decrease the spring pressure of spring 390. A control spring 398 can be used to provide detent feel.

A selector valve 400 can be used to establish a reverse drive range or a forward drive range. It includes a valve spool 402 slidably situated within a valve chamber 404. Supply pressure passage 374 communicates with the chamber 404 at a location intermediate valve lands 406 and 408 carried by the spool 402. When the spool 402 assumes the neutral position shown, fluid communication between passage 274 and the clutch servo and the brake servo is interrupted. On the other hand, if the spool 402 is moved to the drive range position D, communication between passage 274 and the clutch servo is established while pressure distribution to the reverse brake band servo is interrupted.

Movement of the selector valve spool 402 in a right-hand direction to the reverse R position establishes communication between passage 374 and the reverse brake servo. Pressure distribution to the clutch servo is interrupted.

The ratio valve of FIGURE 11 operates in substantially the same fashion as the ratio valve described previously with reference to FIGURE 10. Following operation of the driveline in the take-up phase, the engine torque is increased over a narrow speed range to increase the engine fuel economy. This economy point is reached at a desired low manifold pressure. Once this pressure is achieved the driveline thereafter operates in a so-called economy zone and the ratio valve makes an appropriate adjustment of the speed ratio of drive 318 as the load requirements vary. It does this in response to errors in the engine manifold pressure that are sensed by it. This control can be achieved by appropriately calibrating the spring 390 and the vacuum servo.

The influence of the control forces of the vacuum servo and the spring 390 can be modified, however, as the vehicle operator advances the engine carburetor throttle setting to the so-called performance range thus conditioning the driveline for operation in the performance zone described with reference to FIGURES 5 and 8.

Having thus described preferred embodiments of our invention, what we claim and desire to secure by U.S. Letters Patent is:

1. In a control system for a power transmission mechanism capable of delivering driving torque from an engine to a driven member, a governor valve assembly comprising a governor body drivably connected to said engine, a valve chamber in said valve body, a valve element mounted within said chamber and adapted for radial displacement with respect to the axis of rotation of said body, valve spring means normally urging said valve element in a radially inward direction, a source of control pressure, a pressure supply passage communicating with said valve chamber and extending from said source, a governor pressure passage in said body and communicating with said valve chamber on the radially inward side and on the radially outward side of said valve element and an exhaust port communicating with said valve chamber, said valve element being urged against the opposing influence of said spring means by centrifugal force to decrease progressively the degree of communication between said governor pressure passage and said exhaust port while simultaneously progressively increasing the degree of communication between said pressure supply passage and said governor pressure passage whereby the pressure made available to said governor pressure passage is related in magnitude functionally to engine speed.

2. In a control system for a power transmission mechanism capable of delivering driving torque from an engine to a driven member, a governor valve assembly comprising a governor body drivably connected to said engine, a valve chamber in said valve body, a valve element mounted within said chamber and adapted for radial displacement with respect to the axis of rotation of said body, valve spring means normally urging said valve element in a radially inward direction, a source of control pressure, a pressure supply passage communicating with said valve chamber and extending from said source, a governor pressure passage in said body and communicating with said valve chamber on the radially inward side and on the radially outward side of said valve element, and an exhaust port communicating with said valve chamber, said valve element being urged against the opposing influence of said spring means by centrifugal force to decrease progressively the degree of communication between said governor pressure passage and said exhaust port while simultaneously progressively increasing the degree of communication between said pressure supply passage and said governor pressure passage whereby the pressure made available to said governor pressure passage is related in magnitude functionally to engine speed and selectively engageable fluid pressure operated clutch means for drivably connecting said engine and said driven member, said clutch means communicating with said governor pressure passage and responding to the governor pressure developed therein gradually to become applied upon acceleration of said engine from a low speed to a calibrated clutch engaging speed.

3. In a power transmission mechanism capable of delivering power from an engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means communicating with said pressure source for modulating the pressure of said source to produce a resultant governor pressure that is related functionally in magnitude to engine speed, a hydraulic connection between said governor valve means and bypass valve means whereby the latter is urged progressively to a bypass restricting position upon an increase in engine speed thereby conditioning said mechanisms for torque delivery from said engine to said driven member, said governor valve means comprising a valve body drivably connected to said engine, a valve chamber disposed in said valve body, a valve element in said valve chamber adapted for radial displacement with respect to the axis of rotation of said body, the hydraulic connection between said bypass valve means and said governor valve means including a governor pressure passage that communicates with said valve chamber at locations on the radially inward side and on the radially outward side of said valve element, the fluid communication between said governor valve means and said source being established by a pressure feed passage connected with said valve chamber, and an exhaust port communicating with said valve chamber, spring means for normally biasing said valve element toward a radially inward position, said valve element responding to centrifugal force developed upon rotation of said engine to decrease progressively the degree of communication between said exhaust port and said governor pressure passage while simultaneously increasing the degree of communication between said feed passage and said governor pressure passage upon an increase in the speed of rotation of said engine from a low speed to a calibrated saturation speed, the degree of bypass provided by said bypass valve means thereby being reduced to condition said hydrostatic unit for torque delivery as said engine approaches said saturation speed.

4. In a power transmission mechanism capable of delivering power from an engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means drivably connected to said engine and communicating with said pressure source for modulating the pressure of said source to produce a resultant governor pressure that is related functionally in magnitude to engine speed, and pressure augmenting valve means communicating with said governor valve means and with said high pressure circuit portion for modulating the pressure made available to it by said high pressure circuit portion in response to changes in the governor pressure signal supplied by said governor valve means to produce an amplified resultant signal, said bypass valve means being subjected to said resultant signal and actuated thereby to decrease progressively the degree of bypass of said high pressure circuit portion as said engine is accelerated thereby conditioning said mechanism for torque delivery from said engine to said driven member.

5. In a power transmission mechanism capable of delivering power from an engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means communicating with said pressure source for modulating the pressure of said source to produce a governor pressure signal that is related functionally in magnitude to engine speed, a hydraulic connection between said governor valve means and said bypass valve means whereby the latter is urged progressively to a bypass restricting position, said governor valve means comprising a valve body drivably connected to said engine, a valve chamber disposed in said valve body, a valve element in said valve chamber adapted for radial displacement with respect to the axis of rotation of said body, the hydraulic connection between said bypass valve means and said governor valve means including a governor pressure passage that communicates with said valve chamber at locations on the radially inward side and on the radially outward side of said valve element, the fluid communication between said governor valve means and said source being established by a pressure feed passage communicating with said valve chamber, an exhaust port communicating with said valve chamber, a spring means for normally biasing said valve element to a radially inward position, said valve element responding to centrifugal force that is developed upon rotation of said engine to decrease governor pressure passage upon an increase in the speed of rotation of said engine from a low speed to a calibrated saturation speed, the degree of bypass provided by said bypass valve means thereby being reduced to condition said mechanism for torque delivery as said engine approaches said saturation speed, and pressure augmenting valve means communicating with said governor valve means and with said high pressure circuit portion for modulating the pressure made available to it by said high pressure circuit portion in response to changes in the governor pressure signal supplied by said governor valve means to produce an amplified resultant signal, said bypass valve means being subjected to said resultant signal and actuated thereby to decrease progressively the degree of bypass of said high pressure circuit portion as said engine is accelerated thereby conditioning said mechanism for torque delivery from said engine to said driven member.

6. In a power transmission mechanism capable of delivering power from an operator controlled engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means drivably connected to said engine communicating with said pressure source for modulating the pressure of said source to produce a governor pressure signal that is related functionally in magnitude to engine speed, a hydraulic connection between said governor valve means and said bypass valve means whereby the latter is urged progressively to a bypass restricting position upon an increase in engine speed thereby conditioning said mechanism for torque delivery from said engine to said driven member, means for varying the displacement of said second unit from a forward driving positive displacement during torque delivery from said engine to said driven member to a negative displacement for conditioning said mechanism for torque delivery in the opposite direction, shut-off valve means disposed in and partly defining said high pressure circuit portion for blocking fluid flow through said high pressure circuit portion during coast braking operation of said mechanism, and operator controlled retard valve means disposed in and partly defining the hydraulic connection between said governor valve means and said bypass valve means for varying progressively the magnitude of the effective pressure made available to said bypass valve means by said governor valve means whereby the degree of bypass flow can be controlled by the operator.

7. In a power transmission mechanism capable of delivering power from an operator controlled engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means communicating with said pressure source for modulating the pressure of said source to produce a governor pressure signal that is related functionally in magnitude to engine speed, a hydraulic connection between said governor valve means and said bypass valve means whereby the latter is urged progressively to a bypass restricting position upon an increase in engine speed, said governor valve means comprising a valve body drivably connected to said engine, a valve chamber disposed in said valve body, a valve element in said valve chamber adapted for radial displacement with respect to the axis of rotation of said body, the hydraulic connection between said bypass valve means and said governor valve means including a governor pressure passage that communicates with said valve chamber at locations on the radially inward side and on the radially outward side of said valve element, the fluid communication between said governor valve means and said source being established by a pressure feed pasasge communicating with said valve chamber, an exhaust port communicating with said valve chamber, and spring means for normally biasing said valve element to a radially inward position, said valve element responding to centrifugal force that is developed upon rotation of said engine to decrease progressively the degree of communication between said exhaust port and said governor pressure passage while simultaneously increasing the degree of communication between said feed passage and said governor pressure passage upon an increase in the speed of rotation of said engine from a low speed to a calibrated saturation speed, the degree of bypass provided by said bypass valve means thereby being reduced to condition said mechanism for torque delivery as said engine approaches said saturation speed, means for varying the displacement of said second unit from a forward driving positive displacement during torque delivery from said engine to said driven member to a negative displacement for conditioning said mechanism for torque delivery in the opposite direction, shut-off valve means disposed in and partly defining said high pressure circuit portion for blocking fluid flow through said high pressure circuit portion during coast braking operation of said mechanism, and operator controlled retard valve means disposed in and partly defining the hydraulic connection between said governor valve means and said bypass valve means for varying progressively the magnitude of the effective pressure made available to said bypass valve means by said governor valve means whereby the degree of bypass flow can be controlled by the operator.

8. In a power transmission mechanism capable of delivering power from an engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means drivably connected to said engine and communicating with said pressure source for modulating the pressure of said source to produce a resultant governor pressure signal that is related functionally in magnitude to engine speed, a hydraulic connection between said governor valve means and said bypass valve means whereby the latter is urged progressively to a bypass restricting position upon an increase in engine speed thereby conditioning said mechanism for torque delivery from said engine to said driven member, means for varying the displacement of said second unit from a forward driving positive displacement during torque delivery from said engine to said driven member to a negative displacement for conditioning said mechanism for torque delivery in the opposite direction, shut-off valve means disposed in and partly defining said high pressure circuit portion for blocking fluid flow through said high pressure circuit portion during coast braking operation of said mechanism, and operator controlled retard valve means disposed in and partly defining the hydraulic connection between said governor valve means and said bypass valve means for varying progressively the magnitude of the effective pressure made available to said bypass valve means by said governor valve means whereby the degree of bypass flow can be controlled by the operator, a cross-over pressure passage interconnecting said shut-off valve means and said source, and a shuttle valve means disposed in and partly defining said cross-over passage and connected mechanically to displacement varying portions of said second hydrostatic unit for actuating said shut-off valve means to a flow blocking position as the displacement of said second hydrostatic unit assumes a negative value.

9. In a power transmission mechanism capable of delivering power from an operator controlled engine to a driven member, a first hydrostatic unit drivably connected to said engine, a second hydrostatic unit drivably connected to said driven member, said units being disposed in a common hydrostatic circuit whereby the hydrostatic pressure developed by said first unit is adapted to drive said second unit, bypass valve means disposed in a high pressure portion of said hydrostatic circuit for progressively bypassing pressurized fluid from said high pressure circuit portion to a low pressure region, a source of control pressure, governor valve means communicating with said pressure source for modulating the pressure of said source to produce a governor pressure signal that is related functionally in magnitude to engine speed, said governor valve means comprising a valve body drivably connected to said engine, a valve chamber disposed in said valve body, a valve element in said valve chamber adapted for radial displacement with respect to the axis of rotation of said body, a governor pressure passage communicating with said valve chamber at a location on the radially inward side and on the radially outward side of said valve element, the fluid communication between said governor valve means and said source being established by a pressure feed passage connected with said valve chamber, an exhaust port communicating with said valve chamber, spring means for normally biasing said valve element toward a radially inward position, said valve element responding to centrifugal force developed upon rotation of said engine to decrease progressively the degree of communication between said exhaust port and said governor pressure passage while simultaneously increasing the degree of communication between said feed passage and said governor pressure passage upon an increase in the speed of rotation of said engine from a low speed to a calibrated saturation speed, the degree of bypass provided by said bypass valve means thereby being reduced to condition said hydrostatic units for torque delivery as said engine approaches said saturation speed, means for varying the displacement of said second unit from a forward driving positive displacement during torque delivery from said engine to said driven member to a negative displacement for conditioning said mechanism for torque delivery in the opposite direction, shut-off valve means disposed in and partly defining said high pressure circuit portion for blocking fluid flow through said high pressure circuit portion during coast braking operation of said mechanism, and operator controlled retard valve means disposed in and partly defining the hydraulic connection between said governor valve means and said bypass valve means for varying progressively the magnitude of the effective pressure made available to said bypass valve means by said governor valve means whereby the degree of bypass flow can be controlled by the operator, a cross-over passage interconnecting said shut-off valve means and said source, and a shuttle valve means disposed in and partly defining said cross-over passage and connected mechanically to displacement varying portions of said second hydrostatic unit for actuating said shut-off valve means to a flow blocking position as the displacement of said second hydrostatic unit assumes a negative value.

10. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, and manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes.

11. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, an operator controlled means for applying an auxiliary force to said valve element to upset the balanced forces of said spring means and said manifold pressure operated servo and cause said ratio valve means to assume an increased speed reduction condition thereby allowing said engine to operate at an increased brake specific fuel consumption at an increased manifold pressure to provide maximum performance operation as the engine throttle is advanced toward a wide open position.

12. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said drive member changes, a fluid pressure source, governor valve means drivably connected to said engine and communicating with said source for producing a governor pressure signal that is related functionally in magnitude to engine speed, a hydraulic connection between said governor valve means and said ratio valve means whereby governor pressure force is caused to act upon said ratio valve element to augment the influence of said manifold pressure operated servo means, and a passage interconnecting said source and said ratio valve means whereby said ratio valve element is subjected to the pressure of said source to augment the action of said calibrated spring means.

13. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, an operator controlled means for applying an auxiliary force to said ratio valve to upset the balanced forces of said spring means and said manifold pressure operated servo and cause said ratio valve to assume an increased speed reduction condition thereby allowing said engine to operate at an increased brake specific fuel consumption at an increased manifold pressure to provide maximum performance operation as the engine throttle is advanced toward a wide open position, a fluid pressure source, governor valve means drivably connected to said engine and communicating with said source for producing a governor pressure that is related functionally in magnitude to engine speed, a hydraulic connection between said governor valve means and said ratio valve means whereby governor pressure force is caused to act upon said ratio valve element to augment the influence of said manifold pressure operated servo means, and a passage interconnecting said source and said ratio valve means whereby said ratio valve element is subjected to the pressure of said source to augment the action of said calibrated spring means.

14. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, and manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, a low pressure portion of said hydrostatic circuit communicating with said source to provide a supercharge pressure for said hydrostatic circuit and supercharge pressure regulator valve means communicating with said low pressure hydrostatic circuit portion for maintaining a relatively constant supercharge pressure.

15. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, an operator controlled means for applying an auxiliary force to said valve element to upset the balanced forces of said spring means and said manifold pressure operated servo and cause said ratio valve means to assume an increased speed reduction condition thereby allowing said engine to operate at an increased brake specific fuel consumption at an increased manifold pressure to provide maximum performance operation as the engine throttle is advanced toward a wide open position, a low pressure portion of said hydrostatic circuit communicating with said source to provide a supercharge pressure for said hydrostatic circuit and supercharge pressure regulator valve means communicating with said low pressure hydrostatic circuit portion for maintaining a relatively constant supercharge pressure.

16. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member, said hydrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, a fluid pressure source, governor valve means drivably connected to said engine and communicating with said source for producing a governor pressure signal that is related functionally in magnitude to engine speed, a hydraulic connection between said governor valve means and said ratio valve means whereby governor pressure force is caused to act upon said ratio valve element to augment the influence of said manifold pressure operated servo means, and a passage interconnecting said source and said ratio valve means whereby said ratio valve element is subjected to the pressure of said source to augment the action of said calibrated spring means, a low pressure portion of said hydrostatic circuit communicating with said source to provide a supercharge pressure for said hydrostatic circuit and supercharge pressure regulator valve means communicating with said low pressure hydrostatic circuit portion for maintaining a relatively constant supercharge pressure.

17. In an infinitely variable power transmission mechanism adapted to deliver power from an internal combustion engine to a driven member, said engine comprising a throttle controlled air fuel mixture intake manifold, a first hydrostatic unit drivably connected to said engine, a second hydrostatic unit drivably connected to said driven member said hyrostatic units being disposed in a hydrostatic circuit whereby the pressure developed by said first unit drives said second unit, fluid pressure operated servo means for varying the relative displacement of said units and including a servo piston mechanically connected to displacement varying portions of one of said hydrostatic units, a fluid pressure source, conduit structure interconnecting said source and said displacement varying servo means including separate portions extending to each side of said servo piston, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, an operator controlled means for applying an auxiliary force to said ratio valve to upset the balanced forces of said spring means and said manifold pressure operated servo and cause said ratio valve to assume an increased speed reduction condition thereby allowing said engine to operate at an increased brake specific fuel consumption at an increased manifold pressure to provide maximum performance operation as the engine throttle is advanced toward a wide open position, a fluid pressure source, governor valve means drivably connected to said engine and communicating with said source for producing a governor pressure that is related functionally in magnitude to engine speed, a hydraulic connection between said governor valve means and said ratio valve means whereby governor pressure force is caused to act upon said ratio valve element to augment the influence of said manifold pressure operated servo means, and a passage interconnecting said source and said ratio valve means whereby said ratio valve element is subjected to the pressure of said source to augment the action of said calibrated spring means, a low pressure portion of said hydrostatic circuit communicating with said source to provide a supercharge pressure for said hydrostatic circuit and supercharge pressure regulator valve means communicating with said low pressure hydrostatic circuit portion for maintaining a relatively constant supercharge pressure.

18. In an infinitely variable power transmission mechanism adapted to deliver power from an internal combustion engine to a driven member, said engine comprising a throttle controlled air-fuel mixture intake manifold, a first rotary portion of said mechanism being drivably connected to said engine, a second rotary portion of said mechanism being drivably connected to said driven member, fluid pressure operated servo means having a pair of pressure chambers for varying the relative speeds of said first and second portions, a fluid pressure source, conduit structure interconnecting said source and each pressure chamber of said servo means including separate portions extending to each pressure chamber, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, and manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes.

19. In an infinitely variable power transmission mechanism adapted to deliver power from an internal combustion engine to a driven member, said engine comprising a throttle controlled air-fuel mixture intake manifold, a first rotary portion of said mechanism being drivably connected to said engine, a second rotary portion of said mechanism being drivably connected to said driven member, fluid pressure operated servo means having a pair of pressure chambers for varying the relative speeds of said first and second portions, a fluid pressure source, conduit structure interconnecting said source and each pressure chamber of said servo means including separate portions extending to each pressure chamber, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, an operator controlled means for applying an auxiliary force to said valve element to upset the balanced forces of said spring means and said manifold pressure operated servo and cause said ratio valve means to assume an increased speed reduction condition thereby allowing said engine to operate at an increased brake specific fuel consumption at an increased manifold pressure to provide maximum performance operation as the engine throttle is advanced toward a wide open position.

20. In an infinitely variable power transmission mechanism adapted to deliver power from an internal combustion engine to a driven member, said engine comprising a throttle controlled air-fuel mixture intake manifold, a first rotary portion of said mechanism being drivably connected to said engine, a second rotary portion of said mechanism being drivably connected to said driven member, fluid pressure operated servo means having a pair of pressure chambers for varying the relative speeds of said first and second portions, a fluid pressure source, conduit structure interconnecting said source and each pressure chamber of said servo means including separate portions extending to each pressure chamber, ratio valve means disposed in and partly defining said conduit structure for distributing balanced pressures to each conduit structure portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, a fluid pressure source, governor valve means drivably connected to said engine and communicating with said source for producing a governor pressure signal that is related functionally in magnitude to engine speed, a hydraulic connection between said governor valve means and said ratio valve means whereby governor pressure force is caused to act upon said ratio valve element to augment the influence of said manifold pressure operated servo means, and a passage interconnecting said source and said ratio valve means whereby said ratio valve element is subjected to the pressure of said source to augment the action of said calibrated spring means.

21. In an infinitely variable power transmission mechanism adapted to deliver power from an internal combustion engine to a driven member, said engine comprising a throttle controlled air-fuel mixture intake manifold, a first rotary portion of said mechanism being drivably connected to said engine, a second rotary portion of said mechanism being drivably connected to said driven member, fluid pressure operated servo means having a pair of pressure chambers for varying the relative speeds of said first and second portions, a fluid pressure source, conduit structure interconnecting said source and each pressure chamber of said servo means including separate portions extending to each pressure chamber, ratio valve means disposed in and partly defining said conduit structure for distributing balanced pressures to each circuit portion, said ratio valve means including a balanced flow distributing valve element, calibrated spring means acting upon said valve element to urge it normally in one direction to upset the balanced pressures in said conduit structure portions to increase the speed reduction of said mechanism, manifold pressure operated servo means communicating with said engine intake manifold for producing a manifold pressure force that opposes the influence of said spring means, the manifold pressure being effective upon said valve element to tend to upset the balanced pressures in said conduit structure portions and cause said mechanism to assume an increased speed ratio condition, said ratio valve being calibrated to cause said engine to operate at a reduced brake specific fuel consumption with a substantially constant manifold pressure as the load upon said driven member changes, an operator controlled means for applying an auxiliary force to said ratio valve to upset the balanced forces of said spring means and said manifold pressure operated servo and cause said ratio valve to assume an increased speed reduction condition thereby allowing said engine to operate at an increased brake specific fuel consumption at an increased manifold pressure to provide maximum performance operation as the engine throttle is advanced toward a wide open position, a fluid pressure source, governor valve means drivably connected to said engine and communicating with said source for producing a governor pressure that is related functionally in magnitude to engine speed, a hydraulic connection between said governor valve means and said ratio valve means whereby governor pressure force is caused to act upon said ratio valve element to augment the influence of said manifold pressure operated servo means, and a passage interconnecting said source and said ratio valve means whereby said ratio valve element is subjected to the pressure of said source to augment the action of said calibrated spring means.

References Cited by the Examiner
UNITED STATES PATENTS

| | | | |
|---|---|---|---|
| 2,972,224 | 2/61 | Forster | 60—19 |
| 3,135,087 | 6/64 | Ebert | 60—19 |
| 3,139,723 | 7/64 | Hollowell | 60—19 |

JULIUS E. WEST, *Primary Examiner.*
EDGAR W. GEOGHEGAN, *Examiner.*